United States Patent Office 3,162,664
Patented Dec. 22, 1964

3,162,664
CARBONATE DIISOCYANATES
Thomas K. Brotherton, South Charleston, and John W. Lynn, Charleston, W. Va., assignors to Union Carbide Corporation, a corporation of New York
No Drawing. Filed Dec. 28, 1960, Ser. No. 78,866
21 Claims. (Cl. 260—463)

This invention relates, in general, to novel diisocyanates and to a process for their preparation. In one aspect, this invention relates to a new class of carbonate diisocyanates.

The novel carbonate diisocyanates of this invention can be conveniently represented by the following general formula:

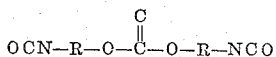

wherein R represents a member selected from the group consisting of divalent substituted and unsubstituted aliphatic, alicyclic, aromatic and heterocyclic groups. Preferred compounds are those wherein R represents a divalent radical containing from 2 to 12 carbon atoms. Particularly preferred compounds represented by the aforesaid formula are those wherein R represents a member selected from the group consisting of alkylene, alkenylene, alkynylene, arylene, arylene-alkylene, alkylene-arylene, alkarylene, arylenealkenylene, alkenylenearylene, arylenealkynylene, alkynylenearylene, cycloalkylene, cycloakenylene, alkylcycloalkylene, alkylcycloalkenylene, cycloalkylenealkylene, cycloalkenylenealkylene, heterocyclylene, heterocyclylenealkylene, alkenyleneheterocyclylene, aryleneheterocyclylene, and heterocyclylenearylene groups containing from 2 to 12 carbon atoms.

Illustrative compounds encompassed by the present invention include, among others, bis(2-isocyanatoethyl) carbonate, bis(9-isocyanatononyl) carbonate, bis(4-isocyanatophenyl) carbonate, bis(3-isocyanatocyclohexyl) carbonate, bis(4-isocyanato-2-butenyl) carbonate, and the like.

The term "substituted" as used throughout the specification and appended claims is meant to further define the novel compositions of matter to include those wherein the aforementioned R groups can be aliphatic with alicyclic or aromatic substituents; alicyclic with aliphatic or aromatic substituents; or aromatic with aliphatic or alicyclic substituents in addition to other groups hereinafter indicated.

The diisocyanates are very reactive materials which condense readily with active hydrogen-containing compounds such as alcohols, amines, carboxylic acids, amides, and water, to form the corresponding carbamates, ureas, and the like. Additionally, the diisocyanates can be homopolymerized to yield dimeric, trimeric and polymeric substances, or copolymerized to form valuable polymeric products. Isocyanate-containing copolymers have been found particularly useful in the preparation of urethane foams, fibers, films, coatings, elastomers, and castings. For example, the polyisocyanates are useful in the preparation of flexible, high molecular weight polymers by incorporating the polyisocyanate with flexible resins such as polyether glycols.

Inasmuch as the novel compositions of this invention are multifunctional, in that each compound contains at least two isocyanate groups in the molecule, they are particularly useful in those fields of application wherein polyisocyanates have been utilized. More particularly, the novel compositions of the instant invention can be utilized as reactive intermediates to produce numerous derivatives.

It is therefore an object of the present invention to provide novel diisocyanates which are suitable for use in the plastic and resin field. Another object is to provide new compositions of matter comprising the carbonate diisocyanates. A further object of the present invention is to provide new compositions of matter comprising the bis(isocyanatoalkyl) carbonates, the bis(isocyanatocycloalkyl) carbonates, and the bis(isocyanatoaryl) carbonates. Another object of this invention is to provide novel carbonates containing at least two isocyanate groups. A still further object of the present invention is to provide novel compounds having polyfunctional properties. Another object of the present invention is to provide a novel process for the preparation of the aforesaid compositions. These and other objects will readily become apparent to those skilled in the art in the light of the teachings herein set forth.

In its broad aspect, this invention is directed to novel carbonates of the aforementioned general formula and to a process for their preparation. These novel compositions are multi-functional in nature in that each compound is characterized by the presence of at least two isocyanate groups which are available for reaction.

In one embodiment of the present invention the novel carbonate diisocyanates are represented by the aforementioned general formula wherein each R represents a divalent aliphatic group and which need not be the same throughout the molecule. Preferred compounds within this embodiment are those represented by the class formula:

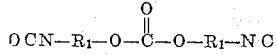

wherein $R_1$ represents a divalent substituted or unsubstituted aliphatic radical containing from 2 to 12 carbon atoms. Particularly preferred compounds within this embodiment are those wherein $R_1$ is a member selected from the group consisting of alkylene, alkenylene, alkynylene, cycloalkylalkylene, cycloalkenylalkylene, and arylalkylene groups containing from 2 to 10 carbon atoms. The divalent radical can be either straight or branched chain and need not be the same throughout the molecule.

The following compounds illustrates the novel diisocyanates of this embodiment of the present invention:

bis(2-isocyanatoethyl) carbonate,
bis(3-isocyanatopropyl) carbonate,
bis(4-isocyanatobutyl) carbonate,
bis(5-isocyanatopentyl) carbonate,
bis(7-isocyanatoheptyl) carbonate,
bis(8-isocyanatooctyl) carbonate,
bis(9-isocyanatononyl) carbonate,
bis(10-isocyanatodecyl) carbonate,
bis(2-methyl-3-isocyanatopropyl) carbonate,
bis (2, 2-dimethyl-3-isocyanatopropyl) carbonate,
bis(3-ethyl-5-isocyanatopentyl) carbonate,
bis(3, 4-diethyl-5-isocyanatopentyl) carbonate,
bis(4, 4-dimethyl-6-isocyanatohexyl carbonate,
bis(2-methyl-4-ethyl-6-isocyanatohexyl) carbonate,
bis(9-isocyanatononyl) carbonate,
bis(5, 6, 7-triethyl-9-isocyanatononyl) carbonate,
2-isocyanatoethyl 3-isocyanatopropyl carbonate,
4-isocyanatobutyl 6-isocyanatohexyl carbonate,
3-isocyanatopropyl 8-isocyanatooctyl carbonate,
5-isocyanatopentyl 6-isocyanatohexyl carbonate,
2-methyl 3-isocyanatopropyl 2-isocyanatoethyl carbonate,
4-ethyl-7-isocyanatoheptyl 6-isocyanatohexyl carbonate,
bis (4-isocyanato-2-butenyl) carbonate,
bis(5-isocyanato-3-pentenyl) carbonate,
bis (7-isocyanato-4-heptenyl) carbonate,
bis(8-isocyanato-4-octenyl) carbonate,
bis(9-isocyanato-5-nonenyl) carbonate,
bis(10-isocyanato-6-decenyl) carbonate,
bis(3-ethyl-5-isocyanato-3-pentenyl) carbonate, bis(3-, 4-dimethyl-5-isocyanato-3-pentenyl) carbonate,
bis(2-methyl-4-ethyl-6-isocyanato-3-hexenyl) carbonate,
bis (5, 6, 7-triethyl-9-isocyanato 6-nonenyl) carbonate,
4-isocyanato-2-butenyl 3-isocyanatopropyl carbonate,
4-isocyanato-2-butenyl 5-isocyanato-3-pentenyl carbonate,
4-ethyl-7-isocyanato-5-heptenyl 6-isocyanato-3-hexenyl carbonate,
bis(2-phenyl-3-isocyanatopropyl) carbonate,
bis(3-naphthyl-5-isocyanatopentyl carbonate,
bis(3-styryl-5-isocyanatopentyl) carbonate,
bis(4-tolyl-6-isocyanatohexyl) carbonate,
bis(6-cumenyl-7-isocyanatoheptyl) carbonate,
bis(5-xylyl-8-isocyanatooctyl) carbonate,
bis(7-mesityl-9-isocyanatononyl) carbonate,
bis(2-cyclohexyl-3-isocyanatopropyl) carbonate,
bis(3-cyclohexyl-5-isocyanatopentyl) carbonate,
bis(4-cyclohexyl-6-isocyanatohexyl) carbonate,
bis (5-cyclohexylmethyl-7-isocyanatoheptyl) carbonate,
bis 3-cycloheptyl-5-isocyanatopentyl) carbonate,
bis(3-cyclohexenyl-5-isocyanatopentyl) carbonate,
bis(5-cycloheptenylmethyl-8-isocyanatooctyl) carbonate
and the like.

In a second embodiment of the present invention, the novel diisocyanates can be represented by the aforementioned general formula wherein each R represents a divalent cycloaliphatic group and which need not be the same throughout the molecule. Preferred compounds within this embodiment are those represented by the class formula:

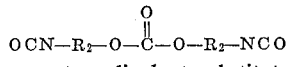

wherein $R_2$ represents a divalent substituted or unsubstituted cycloaliphatic radical containing from 4 to 12 carbon atoms. Particularly preferred compounds within this embodiment are those wherein $R_2$ is a member selected from the group consisting of cycloalkylene, cycloalkenylene, cycloalkynylene, alkycycloalkylene, alkylcycloalkenylene, alkylcycloalkynylene, alkylenecycloalkylene, and cycloalkylenealkylene groups containing from 4 to 10 carbon atoms. The divalent cycloaliphatic radical need not be the same throughout the molecule.

Illustrative novel diisocyanates of this embodiment of the present invention include, among others, the following: bis(2-isocyanatocyclobutyl) carbonate, bis(3-isocyanatocyclopentyl) carbonate, bis(4-isocyanatocyclohexyl) carbonate, bis(5-isocyanatocycloheptyl) carbonate, bis(6-isocyanatocyclooctyl) carbonate, bis(7-isocyanatocyclononyl) carbonate, bis(3-isocyanato-4-cyclopentenyl) carbonate, bis (4-isocyanato-5-cyclohexenyl) carbonate, bis(2-isocyanatocyclobutylmethyl) carbonate, bis(2-isocyanato-3-ethylcyclobutyl) carbonate, bis(3-isocyanatoethyl-2-cyclobutyl) carbonate, bis(3-isocyanatocyclopentylmethyl) carbonate, bis(3-isocyanato-2-ethylcyclopentyl) carbonate, bis (2-isocyanatoethyl-3-cyclopentyl) carbonate, bis(5-isocyanatocycloheptylmethyl) carbonate, bis(3-isocyanato-5-methylcyclohexyl) carbonate, bis(3-isocyanato-5,6-dimethylcyclohexyl) carbonate, bis-3-isocyanato-4-ethylcyclopentyl) carbonate, bis (3-isocyanato-4,5-diethylcyclopentyl) carbonate, bis(4-isocyanato-5-methyl-2-cyclohexenyl) carbonate and the like.

In another embodiment of the present invention, the novel diisocyanates can be represented by the aforementioned general formula wherein each R represents a divalent aromatic group and which need not be the same throughout the molecule. Preferred compounds within this embodiment are those represented by the class formula:

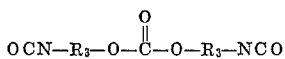

wherein $R_3$ represents a divalent substituted or unsubstituted aromatic radical containing from 6 to 12 carbon atoms. Particularly preferred compounds within this embodiment are those wherein $R_3$ is a member selected from the group consisting of arylene, arylenealkylene, alkylenearylene, alkylarylene, arylenealkenylene and alkenylenearylene groups containing from 6 to 10 carbon atoms. The divalent aromatic radicals need not be the same throughout the molecule.

Typical novel diisocyanates encompassed by this embodiment of the present invention include, among others, the following: bis(4-isocyanatophenyl) carbonate, bis(2-isocyanatophenyl) carbonate, bis(3-isocyanatophenyl) carbonate, bis(7-isocyanato-2-naphthyl) carbonate, bis(7-isocyanato-1-naphthyl) carbonate, bis(4'-isocyanato-4-biphenylyl) carbonate, bis(5-isocyanato-2-indenyl) carbonate, bis(4-isocyanatobenzyl) carbonate, bis(4-isocyanatophenylethyl) carbonate, bis(7-isocyanato-2-naphthylmethyl) carbonate, bis[4(3'-isocyanatopropyl)phenyl] carbonate, bis(4-isocyanatomethylphenyl) carbonate, bis[2(3'-isocyanatopropyl)naphthyl] carbonate, bis(4-isocyanato-2-methylphenyl) carbonate, bis(6-isocyanato-2,4-xylyl) carbonate, bis(4-isocyanato-3-cumenyl) carbonate, bis (4-isocyanato-2-methoxyphenyl) carbonate, bis(4-isocyanato-2-styryl) carbonate, bis[4(3'-isocyanato-1-propenyl)phenyl] carbonate, and the like.

In a still further embodiment of the present invention the novel diisocyanates can be represented for the aforementioned general formula wherein each R represents a divalent heterocyclic group and which need not be the same throughout the molecule. Preferred compounds within this embodiment are those represented by the class formula:

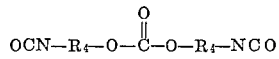

wherein $R_4$ represents a divalent substituted or unsubstituted heterocyclic radical containing from 4 to 12 carbon atoms. Particularly preferred compounds within this embodiment are those wherein $R_4$ is a member selected from the group consisting of heterocyclylene, heterocyclylenealkylene, alkyleneheterocyclylene, arylenheterocyclylene, heterocyclylenearylene, alkylheterocyclylene, and arylheterocyclylene groups containing from 4 to 10 carbon atoms. The divalent heterocyclic radicals need not be the same throughout the molecule.

Novel diisocyanates within this embodiment of the present invention include the following: bis(4-isocyanato-3-furyl) carbonate, bis(6-isocyanato-2-benzofuryl) carbonate, bis(7-isocyanato-2-benzopyranyl) carbonate, bis(5-isocyanato-2H-pyran-3-yl) carbonate, bis(5-isocyanato-2-benzimidazolyl) carbonate, bis(5-isocyanato-2-benzoxazolyl) carbonate, bis(4-isocyanatoimidazolin-2-yl) carbonate, bis(6-isocyanato-3-isoquinolyl) carbonate, and the like.

Although the preferred carbonate diisocyanates of this invention contain no elements other than carbon, hydrogen, oxygen and nitrogen, the molecule can be substituted with various organic and inorganic radicals containing such groups as ether, sulfide, polysulfide, sulfone, sulfoxide, ester, nitro, nitrile, carbonate, and various metal groups.

In accordance with the process of this invention, the novel carbonate diisocyanates of the aforementioned embodiments can be produced in relatively high yields by the reaction of the corresponding carbonate diamine or carbonate diamine salt starting material, contained in an inert, normally liquid reaction medium with a carbonyl dihalide and thereafter recovering the diisocyanate product.

The starting materials for the production of the novel carbonate diisocyanates of the present invention, as hereinbefore indicated, are the corresponding carbonate diamines or carbonate diamine salts. The carbonate diamine salts can be conveniently represented by the following general formula:

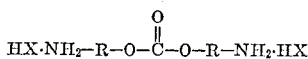

wherein R has the same value as previously indicated and HX represents hydrogen chloride, hydrogen bromide, or mineral acids such as sulfuric, phosphoric and the like. Other acid salts can also be utilized but inasmuch as hydrochloric acid has a common anion with phosgene it is the preferred salt, both from this, as well as economic considerations.

The preparation of the carbonate diamines, and their hydrohalides, such as bis(2-aminoethyl) carbonate, bis(2-aminoethyl) carbonate dihydrohalide, bis(4-aminophenyl) carbonate dihydrohalide and the like is the subject matter of an application entitled "Novel Diamines and Process for Preparation," by T. K. Brotherton and J. W. Lynn, Serial No. 78,865, filed December 28, 1960, and assigned to the same assignee as the instant invention.

These starting materials can be prepared by one of several methods, as indicated in the examples and in the aforementioned copending application. For instance, the bis(aminoalkyl) carbonate dihydrohalides can be conveniently prepared by sparging a carbonyl dihalide, such as phosgene, through a slurry of the hydroxy alkyl amine hydrohalide in an inert liquid reaction medium at a temperature of from about 65° to about 95° C. the carbonate diamine dihydrohalide is then isolated, as for example, by filtration and then washed and dried.

The bis(aminoaryl) carbonate dihydrohalides can be conveniently prepared by one or more alternate routes involving for example, the reaction of nitrophenol and phosgene to form a bis(nitrophenyl) carbonate, followed by reduction of the nitro groups to the corresponding amine groups. Treatment with a hydrogen halide completes the process to form the bis(aminophenyl) carbonate dihydrohalide. For further information regarding the production of the carbonate diamines and their dihydrohalides reference is hereby made to the disclosure of the aforementioned application.

Suitable starting materials for the novel compositions of the first embodiment of this invention include the carbonate diamine sales represented by the class formula:

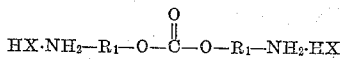

wherein $R_1$ and HX are as previously defined. Illustrative starting compounds include the hydrohalide salts of the following carbonate diamines: bis(2-aminoethyl) carbonate, bis(3-aminopropyl) carbonate, bis(4-aminobutyl) carbonate, bis(5-aminopentyl) carbonate, bis(7-aminoheptyl) carbonate, bis(8-aminooctyl) carbonate, bis(9-aminononyl) carbonate, bis(10-aminodecyl) carbonate, bis(2-methyl-3-aminopropyl) carbonate, bis(2,2-dimethyl-3-aminopropyl) carbonate, bis(3-ethyl-5-aminopentyl) carbonate, bis(3,4-diethyl-5-aminopentyl) carbonate, bis(4,4-dimethyl-6-aminohexyl) carbonate, bis(2-methyl-4-ethyl-6-aminohexyl) carbonate, bis(9-aminononyl) carbonate, bis(5,6,7-triethyl-9-aminononyl) carbonate, 2-aminoethyl 3-aminopropyl carbonate, 3-aminopropyl 8-aminooctyl carbonate, 5-aminopentyl 6-aminohexyl carbonate, 2-methyl-3-aminopropyl 2-aminoethyl carbonate, 4-ethyl-7-aminoheptyl 6-aminohexyl carbonate, bis(4-amino-2-butenyl) carbonate, bis(5-amino-3-pentenyl) carbonate, bis(7-amino-4-heptenyl) carbonate, bis(8-amino-4-octenyl) carbonate, bis(9-amino-5-nonenyl) carbonate, bis(10-amino-6-decenyl) carbonate, bis(3-ethyl-5-amino-3-pentenyl) carbonate, bis(3,4-dimethyl-5-amino-3-pentenyl) carbonate, bis(2-methyl-4-ethyl-6-amino-3-hexenyl) carbonate, bis(5,6,7-triethyl-9-amino-8-nonenyl) carbonate, 4-amino-2-butenyl 4-aminopropyl carbonate, 4-amino-2-butenyl 5-amino-3-pentenyl carbonate, 4-ethyl-7-amino-5-heptenyl 6-amino-3-hexenyl carbonate, bis(2-phenyl-3-aminopropyl) carbonate, bis(3-naphthyl-5-aminopentyl) carbonate, bis(3-styryl-5-aminopentyl) carbonate, bis(4-tolyl-6-aminohexyl) carbonate, bis(6-cumenyl-7-aminoheptyl) carbonate, bis(5-xylyl-8-aminooctyl) carbonate, bis(7-mesityl-9-aminonoyl) carbonate, bis(2-cyclohexyl-3-aminopropyl) carbonate, bis (3-cyclohexyl-5-aminopentyl) carbonate, bis(4-cyclohexyl-6-aminohexyl) carbonate, bis(5-cyclohexylmethyl-7-aminoheptyl) carbonate, bis(3-cycloheptyl-5-aminopentyl) carbonate, bis(3-cyclohexenyl-5-aminopentyl) carbonate, bis(5-cycloheptenylmethyl-8-aminooctyl) carbonate and the like.

The carbonate diamine sales which can be used for the preparation of the novel compositions of the second embodiment of this invention can be represented by the following class formula:

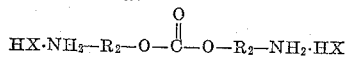

wherein $R_2$ and HX are as previously defined. Illustrative starting materials include the dihydrohalide salts of the following: bis(2-aminocyclobutyl) carbonate, bis(3-aminocyclopentyl) carbonate, bis(4-aminocyclohexyl) carbonate, bis(5-aminocycloheptyl) carbonate, bis(6-aminocyclooctyl) carbonate, bis(7-aminocyclononyl) carbonate, bis(3-amino-4-cyclopentenyl) carbonate, bis(4-amino-5-cyclohexenyl) carbonate, bis(2-aminocyclobutylmethyl) carbonate, bis(2-aminocyclobutyl-3-ethyl) carbonate, bis(3-aminoethyl-2-cyclobutyl) carbonate, bis(3-aminocyclopentylmethyl) carbonate, bis(3-aminocyclopentyl-2-ethyl) carbonate, bis(2-aminoethyl-3-cyclopentyl) carbonate, bis(5-aminocycloheptylmethyl) carbonate, bis(3-amino-5-methylcyclohexyl) carbonate, bis (3 - amino - 5,6-dimethylcyclohexyl) carbonate, bis(3-amino-4-ethylcyclopentyl) carbonate, bis(3-amino-4,5-diethylcyclopentyl) carbonate, bis(4-amino-5-methyl-2-cyclohexenyl) carbonate and the like.

Carbonate diisocyanates encompassed within the third embodiment of this invention can be prepared from the corresponding carbonate diamine salt having the formula:

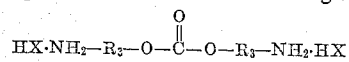

wherein $R_3$ and HX have the same values as previously indicated. Examples of such compounds include the dihydrohalide salts of: bis(4-aminophenyl) carbonate, bis(2-aminophenyl) carbonate, bis(3-aminophenyl) carbonate, bis(7-amino-2-naphthyl) carbonate, bis(7-amino-1-naphthyl) carbonate, bis(4'-amino-4-biphenylyl) carbonate, bis(5-amino-2-indenyl) carbonate, bis(4-aminobenzyl) carbonate, bis(4-aminophenylethyl) carbonate, bis(7-amino-2-naphthylmethyl) carbonate, bis[4(3'-aminopropyl)phenyl] carbonate, bis(4-aminomethylphenyl) carbonate, bis[2(3'-aminopropyl)naphthyl] carbonate, bis(4-amino-2-methylphenyl) carbonate, bis(6-amino-2,4-xylyl) carbonate, bis(4-amino-3-cumenyl) carbonate, bis(4-amino-2-methoxyphenyl) carbonate, bis(4-amino-2-styryl) carbonate, bis[4(3'-amino-1-propenyl)phenyl] carbonate and the like.

In general, the conversion of the carbonate diamine or carbonate diamine salt to the carbonate diisocyanate is accomplished by sparging a carbonyl dihalide, more preferably phosgene, through a slurry of the carbonate diamine or the carbonate diamine dihydrohalide contained in an inert, normally liquid reaction medium at a temperature within the range of from about 100° to about 225° C., more preferably from about 125° to about 170° C., and thereafter recovering the carbonate diisocyanate. In either instance, it is believed that the intermediate carbamoyl chloride is first formed from the free amine and subsequently thermally degraded to the diisocyanate at the reaction temperature employed.

In general, the liquid reaction medium employed in the conversion of the carbonate diamine or carbonate amine salt to the corresponding novel carbonate diisocyanates must be inert to the reactants and stable under the conditions employed. Moreover, it should be easily separable from the resulting carbonate diisocyanate. Typical inert, liquid solvents which have been found suitable for utilization as media in the process of the present invention include, among others, aromatic hydrocarbons such as toluene, xylene, naphthalene, tetrahydronaphthalene, benzene, biphenyl, cymene, amylbenzene; cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methylisobutyl ketone, methylhexyl ketone, diisopropyl keton and other solvents such as tetramethylene sulfone, and the like.

Although reaction temperatures within the aforementioned range of from about 100° to about 225° C., have been found desirable, temperatures above and below this range can also be utilized. However, from economic consideration the optimum yield and rate of reaction are usually attained within the aforesaid ranges. The particular temperature employed will be dependent in part upon the carbonate diamine or carbonate diamine salt starting material.

The optimum temperature for the conversion of the carbonate diamine to the carbonate diisocyanate is influenced, to a degree, by other reaction variables. For instance, in a batch type reactor with ortho-dichlorobenzene as the inert reaction medium, an amine hydrohalide concentration of 20-25 weight percent, based on the weight of the medium, and a phosgene feed rate of 0.5 to 1.0 mole per mole of amine hydrohalide per hour, the optimum temperature range is from about 125° C. to about 170° C. at temperatures below 125° C., the reaction times were too long to be practical, while at temperatures above 170° C., the diisocyanate was, in part, converted to resinous materials. For optimum conversion, the concentration of carbonate diamine dihydrohalide in the reaction medium should be from about 2 to about 50 weight percent based on the weight of the medium.

Pressure is in no wise critical and the instant process can be conducted at atmospheric, subatmospheric and superatmospheric pressures.

Although the process of the instant invention preferably is conducted with phosgene, in its broadest concept the process includes the utilization of any carbonyl dihalide such as carbonyl difluoride, or carbonyl dibromide. However, for economic considerations phosgene is the preferred carbonyl dihalide. In the preparation of the novel isocyanates of this invention, phosgene can be used in either the gaseous or liquid form.

Inasmuch as the yield and rate of formation of the isocyanates are dependent upon several variables, for example, concentration of the amine, solubility of the amine and phosgene in the reaction medium, reaction temperature, pressure and rate of addition of the phosgene, no hard and fast rule can be devised regarding the optimum conditions to be employed.

In a preferred embodiment of the present process the amine hydrochloride was slurried in 1,2-dichlorobenzene. Thereafter, gaseous phosgene was sparged through the reaction mixture at a temperature within the aforementioned range and for a period of time to essentially complete the reaction. After removal of the by-product hydrogen chloride and the solvent a crude isocyanate product was obtained which was refined by known purification techniques such as distillation, washing and the like.

In practice, it has been found that the mole ratio of phosgene to carbonate diamine dihydrohalide amine hydrochloride in the initial reaction medium preferably should be in excess of 3:1, although satisfactory results have been obtained at a lower ratio. When the phosgene subsequently is sparged into the reaction medium, feed rates of up to about 10 moles of phosgene per mole of amine per hour are preferred, although higher rates can equally as well be employed.

The following examples are illustrative:

EXAMPLE I

*Bis(2-Aminoethyl) Carbonate Dihydrochloride*

A mixture of 61 grams of 2-aminoethyl alcohol, (1.0 mole) and 300 milliliters of 1,2,4-trichlorobenzene was saturated with gaseous hydrogen chloride at 69-78° C. Ethyl chloroformate was then gradually added over a period of about fifteen minutes. Thereafter, the reaction temperature was maintained at about 100° C. for approximately seven hours and subsequently the reaction mixture was treated with an excess of gaseous phosgene at about 100° C. for seven and one half hours. The resulting white solid was separated from the reaction by filtration, washed with ethyl ether, and dried under vacuum at ambient temperature, (i.e. 23°-27° C.). The dried material, 22 grams, represented a 19.9 percent yield, was water-soluble and had a melting point of 204.5° C. Upon analysis the compound had the following properties: Calculated for $C_5H_{14}Cl_2N_2O_3$: C, 27.15; H, 6.33; N, 12.66. Found: C, 26.90; H, 6.20; N, 12.75. Infrared spectrum was in agreement with that of the assigned structure with absorption maxima at $3.75\mu$, $3.85\mu$, $4.05\mu$ (amine hydrochloride); $5.70\mu$ (carbonate C=O); $8.0\mu$ carbonate C—O); $10.45\mu$, $12.95\mu$ (open chain carbonate).

EXAMPLE II

*Bis(2-Aminoethyl) Carbonate Dihydrochloride*

A mixture of 97 grams of 2-aminoethyl alcohol, hydrochloride (1.0 mole) and 244 grams of 1,2,4-trichlorobenzene was maintained at a temperature of 70-75° C. for a period of eight hours while gaseous phosgene was added at a rate of 49 cubic centimeters per minute. By-product hydrogen chloride and excess phosgene were evolved during the reaction. The resulting slurry was cooled, filtered, and the solid product edulcorated with 100 milliliters of dry methanol and dried. The dried product, 107 grams, represented a yield of 96.9 percent of the theoretical value, had a melting range of 191-196° C. and an infrared spectrum in agreement with that of the assigned structure. This material was composited with material obtained in a similar manner from other runs and the composite washed with methanol and dried. Upon analysis the compound had the following properties: Calculated for $$C_5H_{14}Cl_2N_2O_3$$

C. 27.15; H. 6.33; N, 12.66. Found: C, 27.32; H, 6.52; N, 12.37. Infrared spectrum was in agreement with that of the assigned structure.

EXAMPLE III

*Bis(2-Isocyanatoethyl) Carbonate*

A slurry of 15 grams of bis(2-aminoethyl) carbonate dihydrochloride, (.068 mole) in 200 milliliters of toluene was maintained at reflux temperature while gaseous phosgene was sparged through the mixture for approximately six hours. 1,2,4-trichlorobenzene was then added to the reaction mixture and the phosgenation was continued for twelve hours with the reaction temperature being maintained at 125°-130° C. After cooling, the mixture was filtered and 8.0 grams of unreacted bis(2-aminoethyl) carbonate dihydrochloride was recovered. The solvents were removed by distillation yielding 12.0 grams of a residue product which represented a yield of 88.5 percent of the theoretical value. Distillation of the residue furnished a refined product with a boiling point of about 120° C. at a pressure of 0.1 millimeters of mercury and a Refractive Index, $n$ 30/D, of 1.4600. Upon analysis the product had the following properties: Calculated for 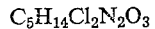 $C_7H_8N_2O_5$: C, 42.00; H, 4.00; N, 14.00. Found: C, 42.16; H, 4.97; N, 14.32. Infrared spectrum was in agreement with that of the assigned structure with absorption maxima at $4.42\mu$ (isocyanate —NCO); $5.74\mu$ (carbonate C=O); $7.94\mu$ (carbonate C—O).

A sample of the refined product was converted into a solid bisurea derivative by reaction with analine. The derivative had a melting point of 163-165° C. and the following properties: Calculated for $C_{19}H_{22}N_4O_5$: C, 59.2; H, 5.71; N, 14.5. Found: C, 58.72; H, 5.61; N, 14.39.

Infrared spectrum was in agreement with that of the assigned structure with absorption maxima at $3.02\mu$ (urea NH); $5.75\mu$ (carbonate C=O); $6.07\mu$ (secondary amide C=O); $6.28\mu$, $6.68\mu$ (aromatic C=C); $6.45\mu$ (secondary amide NH); $8.15\mu$ (carbonate C—O); $13.25\mu$, $14.55\mu$ (monosubstituted aromatic ring).

EXAMPLE IV

Bis(2-Isocyanatoethyl) Carbonate

A slurry of bis(2-aminoethyl) carbonate dihydrochloride in 553 grams of 1,2-dichlorobenzene was maintained at a temperature of 140° C. while gaseous phosgene was introduced below the liquid surface at a rate of 271 cubic centimeters per minute. The phosgene addition was terminated after 21 hours and nitrogen was then sparged through the mixture to remove unreacted phosgene and by-product hydrogen chloride. After cooling to room temperature, the mixture was filtered and the solvent was removed under vacuum. The crude residue product was then passed through a falling film-type evaporative still at 122.5° C. under a pressure of from 0.14 to 0.19 millimeter of mercury. The recovered product, 99 grams, represented a yield of 60 percent of the theoretical and had a Refractive Index, $n$ 30/D, of 1.4623. Upon analysis the product had the following properties: Calculated for $C_7H_8N_2O_5$: C, 42.00; H, 4.00; N, 14.00. Found: C, 41.45; H, 3.92; N, 13.43. Infrared spectrum is in agreement with that of the assigned structure.

EXAMPLE V

Bis(2-Isocyanoethyl) Carbonate

A slurry of 87 grams of bis(2-aminoethyl) carbonate dihydrochloride (0.39 mole) in 909 grams of 1,2-dichlorobenzene was maintained at a temperature of 150° C. while gaseous phosgene was introduced below the liquid surface at a rate of 1 mole per hour. The phosgene addition was terminated after twelve and one half hours and nitrogen was then sparged through the mixture to remove unreacted phosgene and by-product hydrogen chloride. After cooling to room temperature, 6 grams of unreacted bis(2-aminoethyl) carbonate dihydrochloride was isolated and the solvent then removed from the filtrate under vacuum. The crude residue product was then passed through a falling film-type evaporative still at 132° C. under the pressure of 0.1 millimeter of mercury. A 76.3 percent yield of product was obtained. Upon analysis the product had the following properties: Calculated for $C_7H_8N_2O_5$: C, 42.00; H, 4.00; N, 14.00. Found: C, 41.48; H, 4.12; N, 13.91. Infrared spectrum is in agreement with that of the assigned structure.

EXAMPLE VI

Bis(4-Nitrophenyl) Carbonate

A solution containing 417 grams of p-nitrophenol (3.0 moles) in 900 milliliters of benzene was treated with a 20 percent by weight aqueous solution of sodium hydroxide (120 grams, 3.0 moles) with the temperature being maintained at 50° C. Gaseous phosgene was subsequently sparged into the mixture at 2.5 hours at the rate of one mole per hour. The resulting mixture was filtered, the layers separated and the benzene removed from the oil layer by distillation leaving a solid residue. The composited solid from the filtration and oil layer was recrystallized from benzene yielding 432 grams of semi-refined product with a melting point of 140–143° C. The product represented a yield of 94.8 percent of the theoretical value. A sample of this material was recrystallized from an ethylene dichloride-isopropanol mixture for analytical purposes. The following analysis was obtained: Calculated for $C_{13}H_8N_2O_7$: C, 51.3; H, 2.63; N, 9.22. Found: C, 51.2; H, 2.86; N, 8.84. Infrared spectrum was in agreement with that of the assigned structure with maxima at $5.68\mu$ (carbonate C=O); 6.54 and $7.4\mu$ (—NO₂); and $8.0\mu$ (carbonate C—O).

EXAMPLE VII

Bis(4-Aminophenyl) Carbonate Dihydrochloride

A solution containing 75 grams of bis(4-nitrophenyl) carbonate (0.25 mole) in 100 milliliters of ethyl acetate was hydrogenated in the presence of 50 grams of Raney nickel with a maximum hydrogen pressure of 300 pounds per square inch at ambient temperatures (15°–20° C.). After the catalyst had been removed, anhydrous hydrogen chloride was sparged into the clear solution. The product which was isolated by filtration, yielded 125 grams which represented 80.2 percent of the theoretical value and had a decomposition point of 184° C. The following analysis was obtained: Calculated for $C_{13}H_{14}Cl_2N_2O_3$: C, 49.2; H, 4.42; N, 8.83. Found: C, 49.16; H, 4.54; N, 8.70. Infrared bands of functional groups were consistent with those of the assigned structure with maxima at $3.4\mu$ and $3.85\mu$ (NH₄⁺); $5.60\mu$ (carbonate C=O); $6.25\mu$ and $6.65\mu$ (aromatic C=C); $7.85\mu$ (carbonate C—O); and $12.1\mu$ (para-disubstituted aromatic ring).

EXAMPLE VIII

Bis(4-Isocyanatophenyl) Carbonate

An ethyl acetate solution of bis(4-aminophenyl) carbonate, which was prepared in accordance with the procedure described in Example VII was added to 2000 milliliters of a cooled (0° C.) solution of nitrobenzene containing 428 grams of phosgene (4.3 moles). The resulting slurry was gradually heated to a temperature of 118° C. as gaseous phosgene was sparged into the mixture and ethyl acetate was being removed. The phosgenation step required about four hours. After residual phosgene and by-product hydrogen chloride were removed by a nitrogen sparge, a major portion of the solvent was flash-distilled leaving a liquid residue of 144 grams which crystallized on cooling. After washing the crude product with dry ether, 59 grams of light yellow colored product was collected with a melting point of 110–118° C. Assuming an 80 percent yield of diamine from the dinitro compound, the quantity of diisocyanate isolated represents a 52 percent yield based on the diamine. The following analysis was obtained: Calculated for $C_{15}H_8N_2O_5$: C, 60.9; H, 2.7; N, 9.49. Found: C, 60.46; H, 3.25; N, 9.24. Infrared spectrum was in agreement with that of the assigned structure with maxima at $4.4\mu$ (—NCO); $5.6\mu$ (carbonate C=O); and $7.9\mu$ (carbonate C—O).

EXAMPLE IX

Bis(2-isocyanatoethyl) Carbonate Homopolymer

A few drops, approximately 10, of tributylphosphine were mixed into 10 grams of bis(2-isocyanatoethyl) carbonate. In less than 30 seconds the mixture reached a temperature of about 100° C. After cooling to room temperature a clear cross-linked polymeric plaque was obtained. Samples of the homopolymer were evaluated for tensile strength, elongation and stiffness modulus with the results of such evaluation tabulated in Table I.

TABLE I.—BIS(2-ISOCYANATOETHYL) CARBONATE HOMOPOLYMER

| Sample | 1 | 2 | 3 |
|---|---|---|---|
| Tensile Strength [1] | 11,700 | 11,000 | 11,000 |
| Elongation [2] | 3.5 | 2.9 | 2.8 |
| Stiffness Modulus [1] | 451,000 | 435,400 | 452,400 |

[1] Measured in pounds per square inch.
[2] Measured in percent.

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. Carbonate diisocyanates of the formula:

$$OCN-R-O-\underset{\underset{O}{\|}}{C}-O-R-NCO$$

wherein R represents a divalent hydrocarbon radical of from 2 to 12 carbon atoms.

2. Carbonate diisocyanates of the formula:

$$OCN-R_1-O-\underset{\underset{O}{\|}}{C}-O-R_1-NCO$$

wherein $R_1$ represents a divalent aliphatic hydrocarbon radical of from 2 to 12 carbon atoms.

3. Carbonate diisocyanates of the formula:

$$OCN-R_2-O-\underset{\underset{O}{\|}}{C}-O-R_2-NCO$$

wherein $R_2$ represents a divalent cycloaliphatic hydrocarbon radical of from 4 to 12 carbon atoms.

4. Carbonate diisocyanates of the formula:

$$OCN-R_3-O-\underset{\underset{O}{\|}}{C}-O-R_3-NCO$$

wherein $R_3$ represents a divalent aromatic hydrocarbon radical of from 6 to 12 carbon atoms.

5. Carbonate diisocyanates of the formula:

$$OCN-R_1-O-\underset{\underset{O}{\|}}{C}-O-R_1-NCO$$

wherein $R_1$ represents an alkylene radical of from 2 to 12 carbon atoms.

6. Carbonate diisocyanates of the formula:

$$OCN-R_1-O-\underset{\underset{O}{\|}}{C}-O-R_1-NCO$$

wherein $R_1$ represents an alkenylene radical of from 2 to 12 carbon atoms.

7. Carbonate diisocyanates of the formula:

$$OCN-R_1-O-\underset{\underset{O}{\|}}{C}-O-R_1-NCO$$

wherein $R_1$ represents a cycloalkylalkylene radical of from 5 to 12 carbon atoms.

8. Carbonate diisocyanates of the formula:

$$OCN-R_1-O-\underset{\underset{O}{\|}}{C}-O-R_1-NCO$$

wherein $R_1$ represents a cycloalkenylalkylene radical of from 5 to 12 carbon atoms.

9. Carbonate diisocyanates of the formula:

$$OCN-R_1-O-\underset{\underset{O}{\|}}{C}-O-R_1-NCO$$

wherein $R_1$ represents an arylalkylene group of from 7 to 12 carbon atoms.

10. Carbonate diisocyanates of the formula:

$$OCN-R_1-O-\underset{\underset{O}{\|}}{C}-O-R_1-NCO$$

wherein $R_2$ represents a cycloalkylene radical of from 4 to 12 carbon atoms.

11. Carbonate diisocyanates of the formula:

$$OCN-R_2-O-\underset{\underset{O}{\|}}{C}-O-R_2-NCO$$

wherein $R_2$ represents a cycloalkenylene radical of from 4 to 12 carbon atoms.

12. Carbonate diisocyanates of the formula:

$$OCN-R_2-O-\underset{\underset{O}{\|}}{C}-O-R_2-NCO$$

wherein $R_2$ represents an alkylcycloalkylene group of from 5 to 12 carbon atoms.

13. Carbonate diisocyanates of the formula:

$$OCN-R_2-O-\underset{\underset{O}{\|}}{C}-O-R_2-NCO$$

wherein $R_2$ represents an alkylenecycloalkylene radical of from 5 to 12 carbon atoms.

14. Carbonate diisocyanates of the formula:

$$OCN-R_3-O-\underset{\underset{O}{\|}}{C}-O-R_3-NCO$$

wherein $R_3$ represents an arylene radical of from 6 to 12 carbon atoms.

15. Carbonate diisocyanates of the formula:

$$OCN-R_3-O-\underset{\underset{O}{\|}}{C}-O-R_3-NCO$$

wherein $R_3$ represents an arylenealkylene radical of from 7 to 12 carbon atoms.

16. Carbonate diisocyanates of the formula:

$$OCN-R_3-O-\underset{\underset{O}{\|}}{C}-O-R_3-NCO$$

wherein $R_3$ represents an alkylarylene radical of from 7 to 12 carbon atoms.

17. Carbonate diisocyanates of the formula:

$$OCN-R_3-O-\underset{\underset{O}{\|}}{C}-O-R_3-NCO$$

wherein $R_3$ represents an arylenealkenylene radical of from 8 to 12 carbon atoms.

18. Carbonate diisocyanates of the formula:

$$OCN-R_3-O-\underset{\underset{O}{\|}}{C}-O-R_3-NCO$$

wherein $R_3$ represents an alkenylenearylene group of from 8 to 12 carbon atoms.

19. Bis(2-isocyanatoethyl) carbonate.
20. Bis(4-isocyanatophenyl) carbonate.
21. Bis(3-isocyanatocyclohexyl) carbonate.

References Cited in the file of this patent

UNITED STATES PATENTS 2,691,017    Bornfield _____ Oct. 5, 1954

OTHER REFERENCES

Arnold et al.: Chem. Revs., vol. 57, pp. 48 and 74 (1957).